Sept. 9, 1958  D. SCIAKY  2,851,583
GAUGING DEVICE FOR WELD MONITORS
Filed Oct. 29, 1956  3 Sheets-Sheet 1

INVENTOR.
David Sciaky,
BY

Sept. 9, 1958 D. SCIAKY 2,851,583
GAUGING DEVICE FOR WELD MONITORS
Filed Oct. 29, 1956 3 Sheets-Sheet 2

INVENTOR.
David Sciaky,
BY

United States Patent Office 2,851,583
Patented Sept. 9, 1958

2,851,583

GAUGING DEVICE FOR WELD MONITORS

David Sciaky, Chicago, Ill., assignor to Welding Research, Inc., Chicago, Ill., a corporation of Illinois Application October 29, 1956, Serial No. 618,892

10 Claims. (Cl. 219—86)

The invention relates to apparatus for determining the quality of resistance welded joints and has reference in particular to a gauging device for detecting the upward movement of the reciprocating electrode of the welding machine during the welding process and for transmitting said upward movement to strain gauges.

In the production of a resistant spot-weld, the column of metal clamped between the electrodes is heated by a flow of current through the same and is thus caused to expand until a critical temperature is reached, where the unit electrode force equals the yield point of the metal at that temperature. As heating progresses, the mass of metal, which later forms the weld nugget, begins to melt and as melting of the same takes place, the change in state is accompanied by a considerable increase in volume.

The weld may now be considered as a volume of molten metal contained in and completely filling a vessel. However, the molten metal is restrained in all directions by the solid solution of the metal surrounding it. The liquid weld metal therefore exerts a force on all the walls of its vessel, and since the largest surface of the vessel is in the plane of the electrodes the resultant force is sufficient to cause an additional expansion of the metal clamped between the electrodes, all of which produces upward movement of the movable electrode until equilibrium is again attained. It is reasonable that the magnitude of the upward movement of said movable electrode should be related to the volume of the melted metal forming the weld nugget and therefore to the strength of the welded joints.

Accordingly an object of the invention resides in the provision of apparatus for the purposes described which will include a gauging device adapted to be affixed to a resistance welding machine and which will be so constructed and arranged as to actuate a plurality of strain gauges by the upward movement of the movable electrode taking place during the welding process, whereby to produce an electrical impulse proportional to the magnitude of said upward movement and which can be measured.

Another object is to provide a gauging device for the purposes defined which will incorporate a normally expanded collet in telescoping relation with a push rod and wherein additional means are provided, which upon actuation will compress the collet to cause the collet to grip the push rod, so that the upward movement of the movable electrode taking place during the welding process will be transmitted through the collet to the push rod to produce actuation of the strain gauges all as described.

A further object of the invention is to provide a gauging device which will be normally inoperative to permit free up and down movement of the reciprocating electrode of the welding machine in a manner which will not actuate the strain gauges, said device however, being automatically rendered operative immediately in advance of the welding process so that the strain gauges will be proportionally actuated in response to the volumetric expansion of the mass of metal forming the weld nugget.

Another object is to provide a device as described for gauging the upward movement of the movable electrode of a welding machine by electrically measuring the upward movement of a push rod and which is actuated by said electrode through certain operating parts of the gauging device, and wherein said parts are rendered operative or inoperative by a fluid actuated power cylinder.

A further object is to provide a gauging device for the purposes described which will incorporate a push rod and a pivot lever for imparting movement to a plurality of strain gauges, and wherein the pivot axis for said lever may be adjusted to vary the lever ratio so that very small upward movements of the push rod, ranging from five thousandths to twenty thousandths of an inch, will be materially increased in magnitude when transmitted to the strain gauges.

With these and other objects in view, the invention may consist of certain novel features of construction and operation as will be more fully described and particularly pointed out in the specification, drawings and claims appended hereto.

In the drawings which illustrate an embodiment of the invention, and wherein like reference characters are used to designate like parts.

Figure 4 is a view in elevation of the collet;

Figure 5 is a view in elevation of the collet nut; and

Figure 6 is a sectional view through a resistance welded joint and which illustrates the shape and comparative size of the weld nugget for a satisfactory weld.

Figure 1:
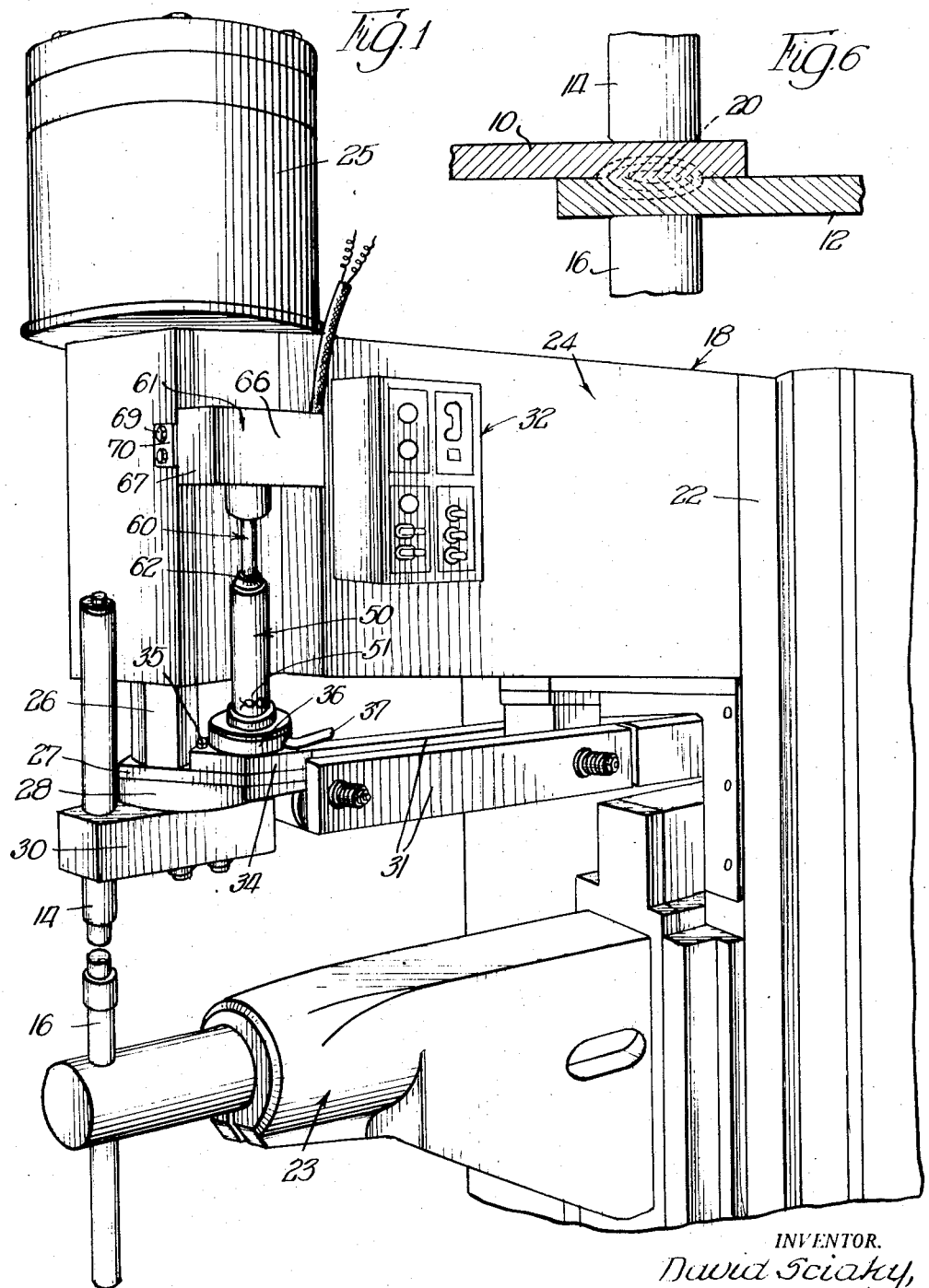
Figure 1 is a fragmentary view in perspective of a welding machine showing the same equipped with a gauging device capable of measuring the upward movement of the movable electrode, all in accordance with present invention.

In producing a spot-weld, two overlapped sheets of metal, such as 10 and 12, Figure 6, are located between the electrodes 14 and 16 of a resistance welding machine generally indicated by numeral 18, Figure 1. The electrodes come together and they apply a predetermined force to the overlapped metal sheets, and then an electric current is passed through the metal by the electrodes, and as the metal begins to heat, its temperature rises and the same expands. The maximum temperature is reached at the interface since the contact resistance in this area is the highest resistance encountered in the current flow path. As the heat progresses, a certain quantity of the metal is melted and the same forms the weld nugget 20. The cross-sectional shape of the weld nugget 20, taken vertically through its central axis, is shown in Figure 6.

During the heating cycle, the weld material is constrained by the mass of cold metal surrounding it and by the electrode force. Taking these factors into consideration, the maximum linear expansion of the weld metal while it is being heated to the melting point can be computed, and it is also possible to compute the volumetric expansion of the weld nugget caused by the change in state of the metal from solid to liquid, all of which will cause the movable electrode 14 to move upwardly. In accordance with the invention, this upward movement is transmitted to a gauging device, and through said device to strain gauges which produce an electrical impulse proportional in magnitude to the upward movement of the electrode. For a more particular discussion in connection with the foregoing, reference made to the pending application of William J. Farrell, Serial No. 521,810, filed July 13, 1955, and entitled Method and Apparatus for Determining the Quality of Resistance Welded Joints.

The welding machine 18 includes frame structure 22, which provides a lower electrode arm or supporting member 23 for the lower fixed electrode 16, and an upper arm 24 which carries the cylinder head 25. A piston, not shown, is adapted to reciprocate within the cylinder head 25, and the plunger 26 is suitably secured to the piston so as to move therewith. As shown in Figure 1, the plunger 26 depends from the lower end of the upper arm 24 and has suitably secured thereto the horizontal plate 27, the spacing member 28, and the electrode carrier 30. The upper movable electrode 14 is suitably fixed to the electrode carrier 30, and the same is positioned in exact vertical alignment with electrode 16 for clamping the work pieces such as 10 and 12 to be welded.

Figure 2:
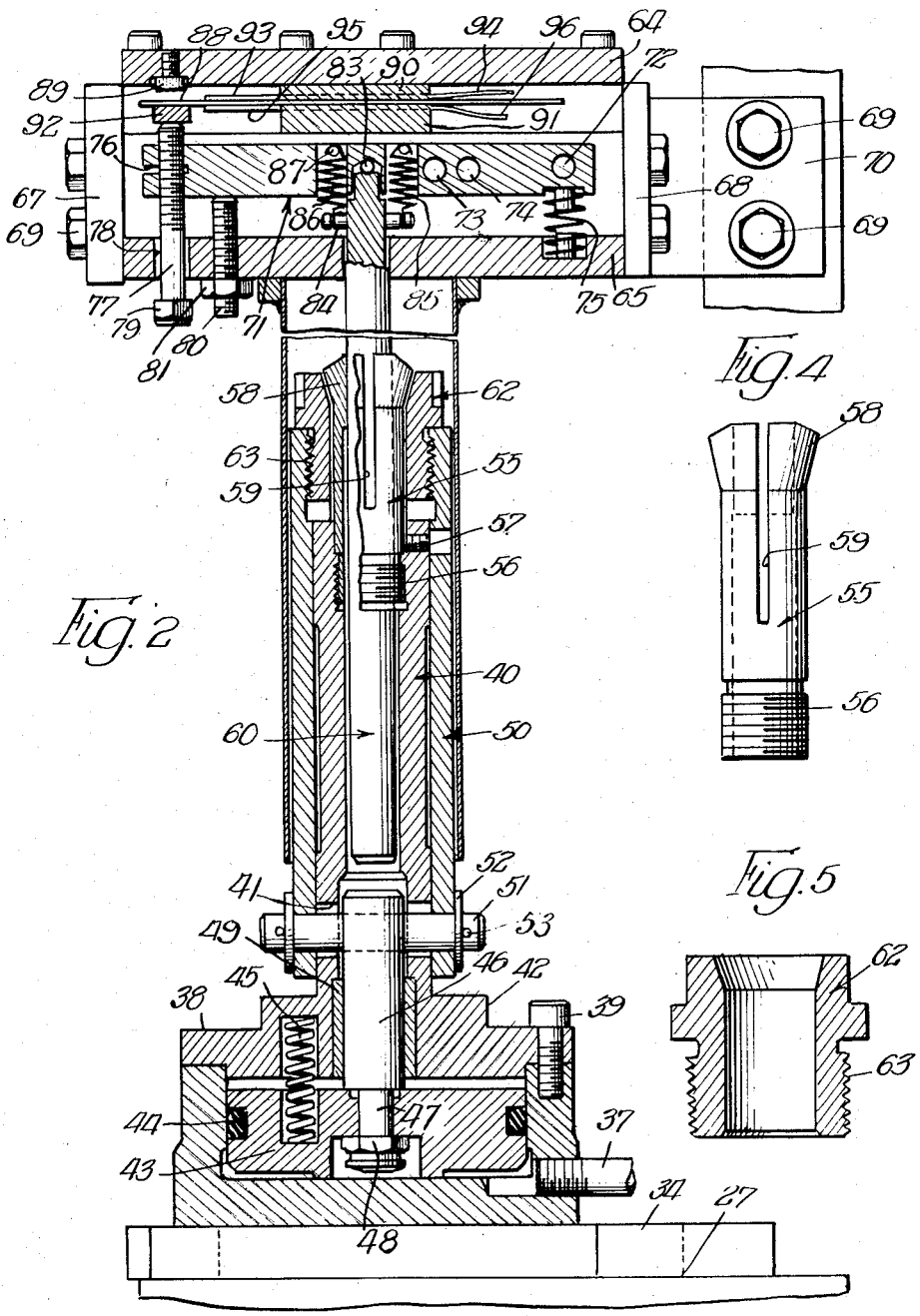
Figure 2 is a vertical sectional view taken substantially through the center of the gauging device of the invention showing the collet thereof as having an inoperative relation with the associated push rod.
Figure 3:
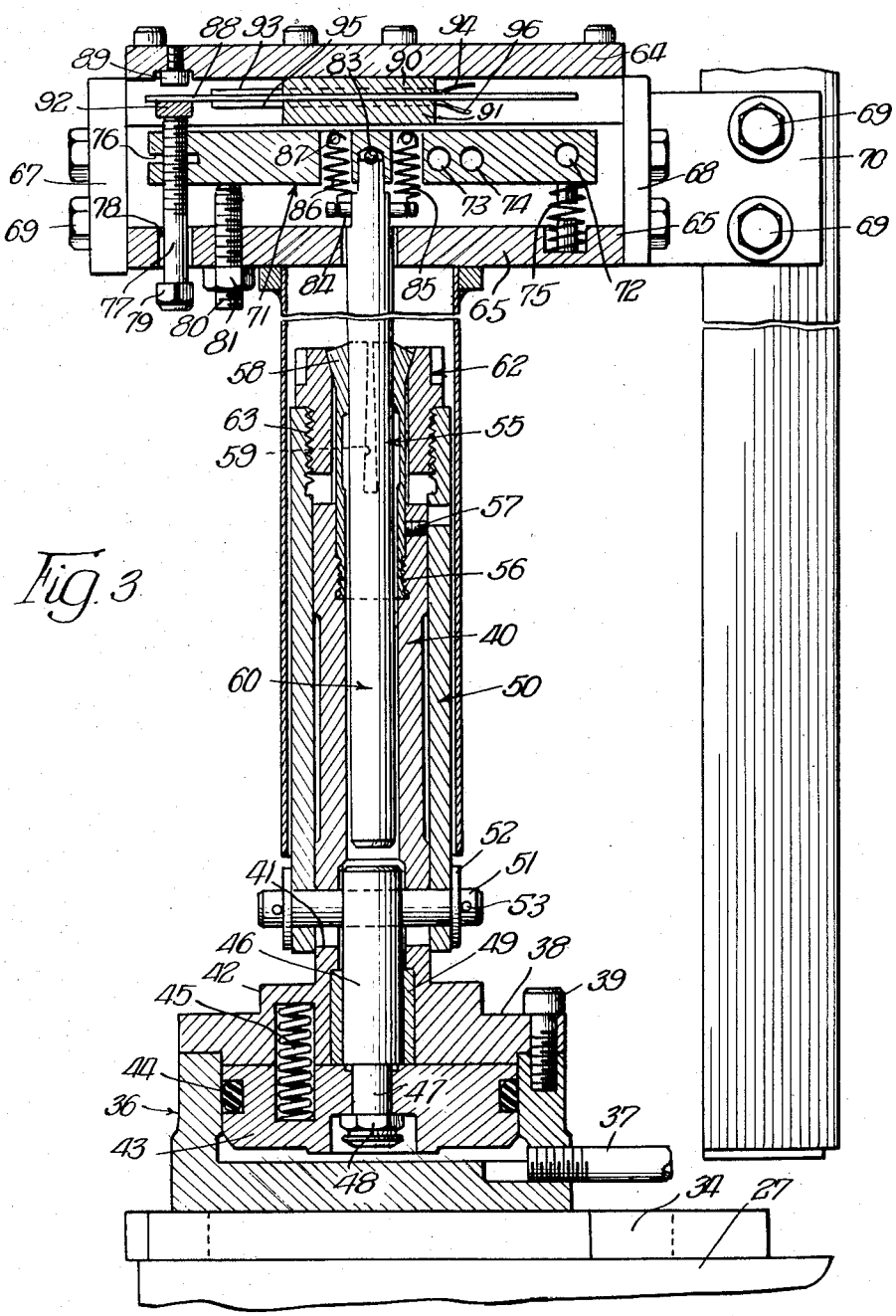
Figure 3 is a vertical sectional view similar to Figure 2, taken through the gauging device but showing the collet in operative relation with the associated push rod.

A high amperage current of low voltage is delivered to the upper electrode 14 by the current conducting bars 31 which connect with the secondary winding of the welding machine at the right hand end and with plate 27 at the left hand end. Through the spacing member 28 and member 30, the said current carrying bars 31 have electrical connection with the upper electrode 14. The numeral 32 indicates the control box for the welding machine and which contains the various switches and automatic controls for initiating operation of the welding machine and for automaticaly timing the various steps in the welding process such as the squeeze time, the welding time, the hold time, and the off period. Before operation of the resistance welding machine of Figure 1, it is necessary to space the electrodes to permit insertion of the work pieces. Accordingly, the desired upward movement is imparted to member 30, spacing member 28, and the horizontal plate member 27 by movement of plunger 26, and which is effected by supplying a pressure medium to the cylinder head 25 below the piston therein, all as is well understood in conventional welding procedure. Following this upward movement, the work pieces are placed between the electrodes and the initial step in the welding process is to effect downward movement of the movable electrode 14 in order to clamp the work pieces between the electrodes with a clamping pressure which is of considerable magnitude, since it is desired to effect as good an electrical contact as possible at the interface of the work pieces. This maximum pressure is reduced to a predetermined extent according to well-known methods, and when this reduced pressure has become stabilized the welding current is applied. This constitutes a reference point from which upward movement of the movable electrode 14 is measured by apparatus as shown in Figures 2 and 3, part of which is fixed to the horizontal plate 27 and part to the upper arm 24 of the welding machine. Said gauging structure will not be described in detail.

The plate 34 is suitably secured to horizontal plate 27, by bolts such as 35, and said plate in turn supports the cylinder 36. The cylinder forms the base of the gauging device, Figures 2 and 3, and it will be understood that said base has a supply pipe such as 37 threadedly connected thereto, and in addition has a top closure 38 releasably secured to the base by screws such as 39. The top closure 38 has the tubular push rod support 40 formed integral therewith, and said support extends vertically upward from the center of the top closure and is provided with the vertically extending slots 41, located diametrically opposite each other adjacent the base of the support and immediately above the flange 42 of said top closure. A piston 43 is adapted to reciprocate within cylinder 36, and for sealing said piston with respect to the side walls of cylinder 36, the piston is provided with an O-ring seal 44. The coil spring 45 having location between the top closure 38 and the piston 43, functions in a manner to maintain the piston in its down position. The stem 46 has a reduced end portion 47, which is threaded for receiving the nut 48 by means of which the stem and piston are fixedly connected together. The stem projects through the top closure 38 and into the lower end of the tubular push rod support 40 and terminates adjacent the diametrically aligned slots 41. Since the piston and stem are adapted to reciprocate with respect to top closure 38, a bushing such as 49 may be provided for the stem.

The stem 46 is articulately connected to the sleeve 50 and which has telescoping relation with the tubular push rod support 40. The connection between the stem and the sleeve is effected by means of a pin such as 51 which passes through aligned openings in the stem and sleeve and which has location within slots 41, in the support 40 so as to permit reciprocating movements of the pin in a vertical direction. Washers such as 52 are carried by the pin at its respective ends, and the pin is retained in place by the cotter pins 53. The sleeve 50, therefore, has vertical reciprocating movements as the piston 43 is caused to reciprocate. When air under pressure is admitted by the pipe 37 to within cylinder 36 and below the piston 43, the piston will be caused to move upwardly to the limit of its stroke and against the tension applied thereto by coil spring 45. This movement of the piston is transmitted by stem 46 and pin 51 to the sleeve 50, and thus the collet 55 is locked to the push rod for actuating the strain gauges as will be clearly understood as the description proceeds.

The collet 55 above referred to, consists of an elongated tubular member having threads 56 at its lower end for threadedly securing the collet within the upper end of the tubular push rod support 40. The collet 55 may be additionally held by the set screw 57 and the upper projecting end of the collet is formed to provide the wedge-shaped portions 58. The upper half of the collet is additionally provided with one or more slots such as 59, whereby said upper end is flexible and can be caused to contract for gripping the push rod 60 which depends from the box or container 61 shown in elevation in Figure 1 and comprising part of the gauging device and which is fixedly secured to the arm 24 of the welding machine.

The collet nut 62 is provided with threads 63 for connection with the sleeve 50, the said nut having location within the upper end of the sleeve so as to project beyond the sleeve. Also, it will be observed that nut 62 has telescoping relation with the collet 55, and as a result of said telescoping relation and the wedge portions 58 provided by the collet, it is only necessary to cause up movement of the collet nut to effect a gripping of the collet with the push rod 60, and a down movement to effect a release of the collet from said push rod. When the collet is released, as shown in Figure 2, the same is inoperative with respect to the push rod. However, when the collet grips the push rod, as shown in Figure 3, the same has operative relation therewith.

In Figure 2, the piston 43, stem 46, and sleeve 50 are shown in a down position and as a result thereof, the collet is inoperative. In other words, the position of the collet nut permits the collet to expand and thus the latter is released so that there is no connection between the sleeve 50 and the push rod 60. However, in Figure 3 the piston 43 is shown elevated to the upper limit of its stroke. The stem 46 and sleeve 50 are also in an "up" position and thus the collet nut has contracted the collet so that the same is in operative connected relation with the push rod 60. The push rod is thus connected through the collet and through the collet nut to the sleeve 50, and thus to the power cylinder of the gauging device.

The box or container 61 contains the deflection beam and strain gauges for transforming the upward movement of the push rod 60 into an electrical impulse. The box includes the top and bottom plates 64 and 65, the side plates 66, and the end plates 67 and 68. By means of the threaded bolts 69 and bracket 70, the box is fixedly secured in desired vertical position on the upper arm 24 of the welding machine.

A lever identified in its entirety by numeral 71 is located within box 61, and in accordance with the invention, said lever may have any one of three different pivoted supports for changing the lever-ratio of the lever with respect to the push rod 60. For the maximum lever-ratio, the pivot support for the lever may be located at 72, which is adjacent the right hand end of the lever. For the minimum lever-ratio, the pivot support may be located at 73, and for an intermediate adjustment said pivot support may be located at 74. The right hand end of the lever has associated therewith a coil spring 75 which is constructed and arranged to eliminate all looseness in the pivot supports for said lever. At its left end, the lever is split as at 76 and, at this end the lever carries the adjustable bolt 77 which depends through the opening 78 in the bottom plate 65, the said depending end being provided with head 79. It is possible to apply a wrench or other tool to head 79 and rotate bolt 77 to adjust its position with respect to lever 71. A stop member in the form of a threaded bolt 80 is provided by the bottom plate 65 and said member is held in desired position by the nut 81.

The push rod 60 extends through opening 82 in the bottom plate 65 and the upper end of the push rod, having location within box 61, has connection with the lever 71. At the point of contact between the push rod and the lever, there is located a hardened steel ball 83 which provides a bearing for eliminating substantially all friction during movement of the parts relative to each other. The push rod carries the pin 84 which projects from the respective sides of the push rod. Each projecting end of the pin has connection with a coil spring such as 85 and 86 respectively, with said coil springs at their upper ends having location within recesses formed in the lever and being connected to the lever by means of the pins 87. The lever 71 is normally positioned in a horizontal plane, such as shown in both Figures 2 and 3 since the weight of the depending push rod 60 functions to hold the lever down against its stop 80. The adjustable bolt 77 is provided for the purpose of transmitting upward movements of the lever 71 to the deflection beam 88. The said beam is formed of any suitable material and is supported by being held between the metal blocks 90 and 91; so as to provide a cantilever beam capable of deflecting to a considerable extent even though the forces applied thereto are relatively light. At the left hand end, the cantilever beam 88 is reinforced on its under surface by the block 92 and it will be observed that said block is in contact with the adjustable bolt 77.

Strain gauges are carried by the deflection beam 88, and these gauges have electrical connection in a circuit whereby the deflection of the beam is transformed into an electrical impulse. One or more compression strain gauges, such as 93, are located on the top side of the deflection beam 88 and the same are connected to an electrical circuit (not shown) by means of the conductors 94. In a similar manner, the deflection beam carries on its under-side one or more tension strain gauges 95, and which are similarly connected into said electrical circuit by the conductors 96. Upward movement of the push rod 60, such as may take place during a welding operation, is accordingly transmitted to the pivot level 71 and through the particular pivoting arrangement for the level, the movement of the push rod applied to the adjustable bolt 77 will be materially increased. Said upward movement of the adjustable bolt is applied directly to the deflection beam and as previously explained, the strain applied to the gauges 93 and 95 transforms the movement into an electrical impulse, the magnitude of which is in direct proportion to the extent of the upward movement of the push rod. For a more particular description of the strain gauges and the manner in which the electrical impulse is produced and measured, reference is made to the co-pending application in the name of David Sciaky, Serial No. 621,108, filed November 8, 1956, and entitled Method and Apparatus for Monitoring Welds.

The first step in the operation of the resistance welding machine is to space the electrodes to permit insertion of the work pieces. Accordingly, the required upward movement is imparted to the horizontal plate 27 and to the parts attached thereto by movement of the plunger 26, and this is effected by supplying a pressure medium to the head 25 below the piston therein. The work pieces may now be placed between the electrodes, and the next step in the welding procedure is to apply a pressure medium to the head 25 above the piston allowing the pressure medium below the piston to exhaust. The operation is continued until a clamping pressure of considerable magnitude is effected to provide good electrical contact at the interface of the work pieces. This maximum pressure may be reduced to a predetermined extent according to conventional welding procedures and when the reduced pressure has become stabilized, the welding current may be applied.

During this spacing of the electrodes and during down movement thereof for clamping the work pieces between said electrodes, it will be understood that the gauging device remains inoperative since during these preliminary steps in the welding process the piston 43, stem 46, and sleeve 50 are located in the down position of Figure 2. Thus the collet is free as regards the push rod 60. Accordingly, the piston, stem, and sleeve may move up and down as a unit with horizontal plate 27, and these movements are not imparted to the push rod 60. In other words, the collet of the gauging device remains inoperative as long as piston 46 is in the down position of Figure 2. After the said reduced pressure on the work pieces has become stabilized and immediately in advance of the welding step, a pressure medium is admitted through the supply pipe 37 to within cylinder 36 and below the piston 43 to cause said piston to move into its up position of Figure 3. The admission of the pressure medium for actuating piston 43 is preferably synchronized with the other steps in the welding procedure. This upward movement of piston 43, stem 46, and sleeve 50 so locates the collet nut 62 with respect to collet 55 that the collet is caused to grip the push rod, and thus the gauging device is rendered operative.

The next step in the welding process is the application of the welding current to the work pieces and during the weld period heating of the metal of said work pieces takes place, and eventually a mass of metal constituting the weld nugget begins to melt and thus changes its state from a solid to a liquid. This liquid weld metal exerts a force which together with the normal expansion of the heated solid metal produces an upward movement of the movable electrode. Although this upward movement of the electrode is quite rapid, nevertheless the same is substantial in magnitude, and since all parts of the gauging device are so connected as to form a unitary structure, the said upward movement is transmitted to the push rod 60 and to the lever 71 to cause pivoting of the same in a clockwise direction. Any one of the pivot supports may be used, either 72, 73, or 74 depending on the lever-ratio desired. The pivoting movement of lever 71 is transmitted through the adjustable bolt 77 to the deflection beam 88, and thus the strain gauges 93 are placed in compression, whereas the strain gauges 95 are placed in tension. An upper stop is provided by the adjustable screw 89 in order to limit upward movement of the beam so that it will not be trained beyond the limit of proportionality.

The invention is not limited to nor by details of construction of the particular embodiment thereof illustrated by the drawings as various other forms of the device will, of course, be apparent to those skilled in the art without departing from the spirit of the invention or the scope of the claims.

What is claimed is:

1. In a gauging device for the purposes described, the combination with a welding machine having an upper movable arm and which carries the movable electrode, of a gauging device including a cylinder fixed to and supported by said arm, said cylinder forming the base of the device and having an upstanding tubular support, a piston mounted within the cylinder for reciprocating movement, a sleeve in telescoping relation with the said support and having connected relation with the piston, a push rod suspended at its upper end from the frame of the welding machine and having its lower portion extending within the tubular support, a gripping element fixed to the tubular support and having telescoping relation with the push rod, and an actuating member for the gripping element, said member being fixed to the sleeve and having telescoping relation with the said gripping element, whereby the reciprocating movements of the piston are imparted to the sleeve to locate the member in either an operative or an inoperating position with respect to the gripping element.

2. In a gauging device for the purposes described, the combination with a welding machine having an upper movable arm and which carries the movable electrode, of a gauging device including a cylinder fixed to and supported by said arm, said cylinder forming the base of the device and having an upstanding tubular support, a piston mounted within the cylinder for reciprocating movement, a sleeve in telescoping relation with said support and having connected relation with the piston, a deflection beam supported by the frame of the welding machine, a push rod for deflecting said beam by upward movement of the push rod, said push rod having its lower portion extending within the tubular support, a gripping element fixed to the tubular support and having telescoping relation with the push rod, an actuating member for the gripping element, said member being fixed to the sleeve and having telescoping relation with the said gripping element, whereby the reciprocating movements of the piston are imparted to the sleeve to locate the member in either an operative or an inoperative position with respect to the gripping element, and at least one strain gauge carried by the deflection beam in a manner whereby it is actuated in proportion to the deflection of said beam.

3. In a gauging device for the purposes described, the combination with a welding machine having an upper movable arm and which carries the movable electrode, of a gauging device including a cylinder fixed to and supported by said arm, said cylinder forming the base of the device and having an upstanding tubular support, a piston mounted within the cylinder for reciprocating movement, a sleeve in telescoping relation with the said support and having connected relation with the piston, a deflection beam supported by the frame of the welding machine, a pivoted lever for actuating said deflection beam, said lever being supported by the frame of the welding machine and having a location below the deflection beam, a push rod suspended from said pivoted lever and having its lower portion extending within the tubular support, a gripping element fixed to the tubular support and having telescoping relation with the push rod, an actuating member for the gripping element, said member being fixed to the sleeve and having telescoping relation with the said gripping element, whereby the reciprocating movements of the piston are imparted to the sleeve to locate the member in either an operative or an inoperative position with respect to the gripping element and strain gauges fixed to and carried by the deflection beam in a manner whereby the strain gauges are actuated in proportion to the deflection of said beam.

4. A gauging device as defined by claim 3, wherein the pivot axis for the pivoted lever may be adjusted to vary the lever-ratio of the same with respect to the push rod, wherein the gripping element consists of a flexible collet capable of circumferential expansion and contraction, and wherein the actuating member consists of a collet nut which effects a contraction of the collet when in an operative position and permits the collet to expand when inoperatively positioned.

5. In a gauging device for the purpose described, the combination with a welding machine having an upper movable arm and which carries the movable electrode, of a gauging device including a power cylinder fixed to and supported by said arm, said power cylinder having a piston adapted to reciprocate therein, an upstanding tubular support formed integral with the power cylinder, a sleeve in telescoping relation with the said support and having an articulated connection with the piston, a push rod suspended from the frame of the welding machine and having its lower portion extending into the tubular support, a flexible gripping element fixed to the tubular support and having telescoping relation with the push rod, and an actuating member for the gripping element, said actuating member being fixed to the sleeve and having telescoping relation with the gripping element, whereby the reciprocating movements of the piston are transmitted to the sleeve to locate the actuating member in either an operative or an inoperative position with respect to the gripping element.

6. In a gauging device for the purposes described, the combination with a welding machine having an upper movable arm and which carries the movable electrode, of a gauging device including a power cylinder fixed to and supported by said arm, said power cylinder having a piston adapted to reciprocate therein, an upstanding tubular support formed integral with the power cylinder, a sleeve in telescoping relation with the said support and having an articulated connection with the piston, a cantilever beam supported by the frame of the welding machine in spaced relation above the tubular support and sleeve, a lever pivotally supported by the frame below the beam and adapted to cause deflection of the beam upon upward movement of the lever, a push rod for actuating the lever, said push rod having its lower end extending into the tubular support, an expandable and contractable gripping element fixed to the tubular support so as to have surrounding relation with the push rod, an actuating member in surrounding relation with the gripping element and having a fixed relation with the sleeve, whereby the reciprocating movements of the piston are transmitted to the sleeve to locate the actuating member in either an operative or in an inoperative position with respect to the gripping element, and strain gauges fixed to and carried by the cantilever beam in a manner whereby the strain gauges are actuated in proportion to the deflection of said beam.

7. A gauging device as defined in claim 6, wherein a minimum, maximum and intermediate pivot support is provided for the lever to permit adjustment of its lever-ratio with respect to the push rod, wherein the gripping element comprises a collet having a longitudinal slot formed therein to render the same expandable and contractable, and wherein the actuating member comprises a collet nut.

8. In apparatus for determining the quality of resistance welded joints, the combinations with a welding machine having an upper movable arm and which carries the movable electrode, of a gauging device for detecting and indicating the upward movement of the movable electrode taking place during the welding step, said device including a deflection beam fixed to the frame of the welding machine, a depending push rod in operative connected relation with the deflection beam for deflecting said beam when the push rod is caused to move in an upward direction, means carried by the movable arm of the welding machine and operative for transmitting the upward movement of the electrode such as may take place during the welding step to the said push rod, and at least one strain gauge carried by the deflection beam in a manner whereby it is actuated in proportion to the deflection of said beam.

9. In apparatus for determining the quality of resistance welded joints, the combinations with a welding machine having an upper movable arm and which carries the movable electrode, of a gauging device for detecting and indicating the upward movement of the movable electrode taking place during the welding step, said device including a deflection beam fixed to the frame of the welding machine, a lever pivotally supported by the said frame and located below the deflection beam, said lever at its end opposite the pivot point having contact with the beam for deflecting the beam upon upward pivotal movement of the lever, a push rod in operative connected relation with the lever and depending from the same, and means carried by the movable arm of the welding machine and operative for transmitting the upward movement of the electrode such as may take place during the welding step to the said push rod, and at least one strain gauge carried by the deflection beam in a manner whereby it is actuated in proportion to the deflection of said beam.

10. Apparatus for determining the quality of resistance of welded joints as defined by claim 9, wherein the pivot axis for the lever may be adjusted to vary the lever-ratio of the same with respect to the push rod.

References Cited in the file of this patent

UNITED STATES PATENTS

| | | |
|---|---|---|
| 1,967,094 | Lincoln | July 17, 1934 |
| 2,377,601 | Bayles | June 5, 1945 |
| 2,472,368 | Cox et al. | June 7, 1949 |
| 2,677,271 | Faris et al. | May 4, 1954 |